March 8, 1932. P. W. MEACHAM 1,848,964
HARVESTING MACHINE
Filed March 7, 1931 3 Sheets-Sheet 1
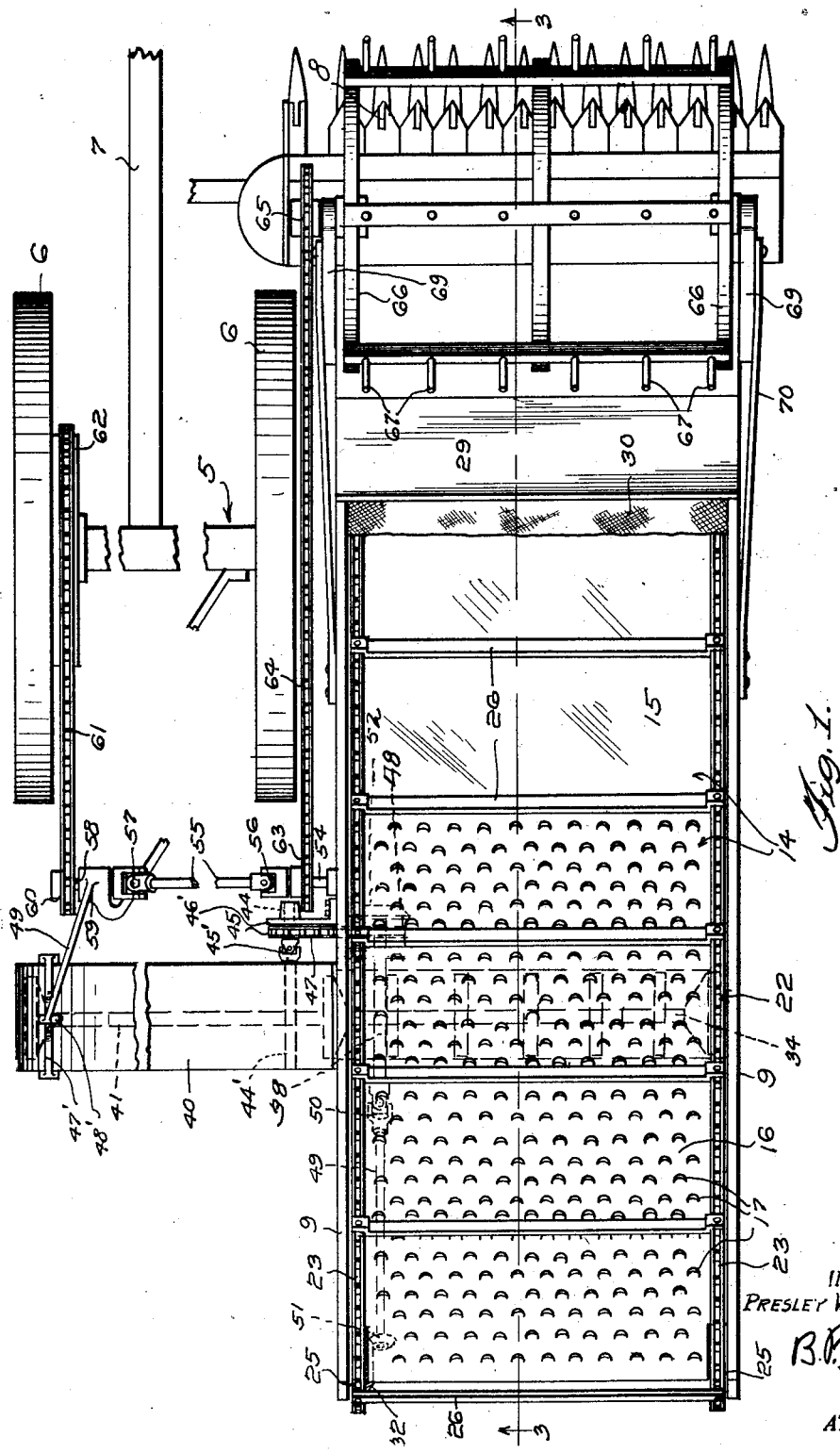
INVENTOR.
PRESLEY W. MEACHAM,
B. P. Newberry
ATTORNEY.

March 8, 1932.  P. W. MEACHAM  1,848,964
HARVESTING MACHINE
Filed March 7, 1931   3 Sheets-Sheet 2
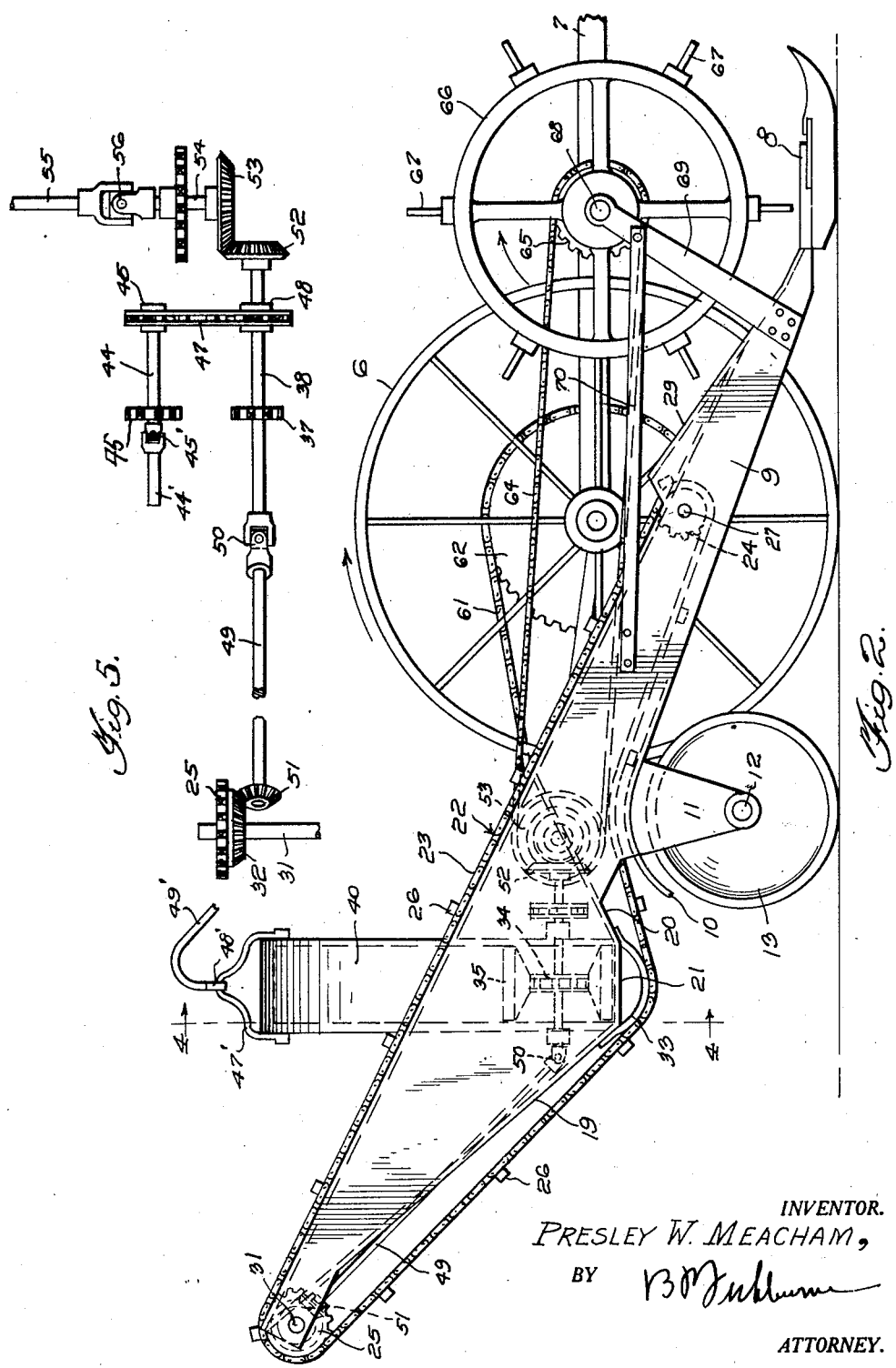
INVENTOR.
PRESLEY W. MEACHAM,
BY
ATTORNEY.

March 8, 1932.                P. W. MEACHAM                 1,848,964
                              HARVESTING MACHINE
                         Filed March 7, 1931      3 Sheets-Sheet 3
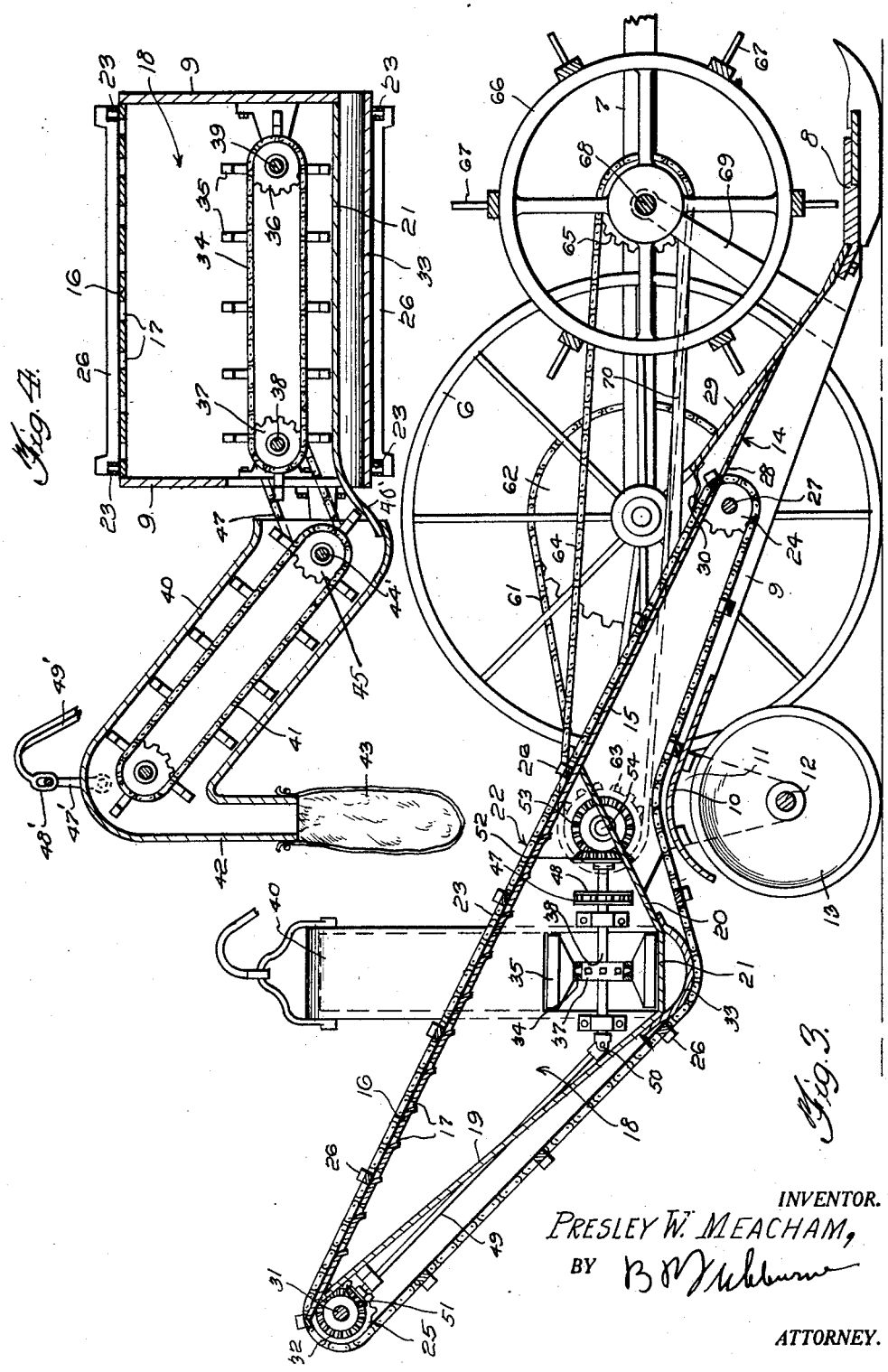
INVENTOR.
PRESLEY W. MEACHAM,
BY
ATTORNEY.

Patented Mar. 8, 1932

1,848,964

UNITED STATES PATENT OFFICE

PRESLEY WILEY MEACHAM, OF MONROE, ARKANSAS

HARVESTING MACHINE

Application filed March 7, 1931. Serial No. 520,361.

My invention relates to a harvesting machine for harvesting easily scattered seed of low growing plants, such as lespedeza, clover, spinach, or the like.

The present invention is an improvement over the harvesting machine disclosed in my Patent No. 1,644,537, issued to me under date of October 4th, 1927.

The harvesting machine embodying the present invention is attached to a wheeled mower, of any well known or preferred type, and embodies a threshing reel acting upon the material or straw at about the time that it is cut, and sweeping the straw and threshed grain rearwardly upon an endless slatted belt. This endless slatted belt conveys the material rearwardly over a plate or bed, a portion of which is perforated so that the seed is separated from the straw and passes to a collecting trough. The upper run of the endless slatted belt passes over the supporting plate while the lower run of the belt passes exteriorly of and beneath the frame of the machine. The threshed seed is, preferably, collected beneath the perforated portion of the supporting plate and conveyed by gravity to the collecting trough. The several operating parts of the machine receive rotation from the traveling wheels of the mower.

In the accompanying drawings forming a part of this specification and in which like numerals are employed to designate corresponding parts throughout the same, Figure 1 is a plan view of the harvesting machine embodying my invention, Figure 2 is a side elevation of the same, Figure 3 is a central vertical longitudinal section taken on line 3—3 of Figure 1, Figure 4 is a transverse section taken on line 4—4 of Figure 2, and Figure 5 is a plan view of the gearing removed.

In the drawings, wherein for the purpose of illustration is shown a preferred embodiment of my invention, the numeral 5 designates a mowing machine, as a whole, having traction wheels 6, draft appliance 7, and mower bar 8, these parts being of the usual construction and connected and correlated in the usual manner. My improved harvesting machine embodies longitudinally spaced sides 9, which are inclined downwardly in a forward direction and are suitably attached to the mower bar 8. A transverse plate 10 is rigidly attached to the sides 9, adjacent their lower edges, and this plate is curved transversely in a direction longitudinally of the sides 9, with its convex surface arranged uppermost. Depending from the plate 10 are arms 11, preferably rigidly attached thereto, carrying a rotatable shaft 12, which, in turn, carries a ground wheel 13, these parts serving to support the sides 9 included in the frame of the harvesting machine.

Extending between the sides 9 of the frame, and rigidly attached thereto at their upper edges, is a stationary bed plate 14, having a lower imperforate portion 15, and an upper imperforate portion 16, having apertures or perforations 17, as shown. This bed plate is inclined downwardly in a forward direction, and the forward end of the bed plate is arranged rearwardly of and adjacent to the mower bar 8, to receive the cut straw and grain from the mower bar. Arranged beneath the upper perforated portion of the bed plate 14 is a seed collecting chamber or hopper 18, the bottom of which embodies downwardly inclined converging bottom plates 19 and 20, leading to a trough or pocket 21. The collecting chamber or hopper is closed and its sides are formed by the sides 9, Figure 4. The bottom plates 19 and 20 extend beneath the entire area of the perforated portion 16 of the bed plate, and the threshed seed passing through the apertures 17 fall upon the bottom plates 19 and 20, and are fed by gravity by such inclined bottom plates to the trough 21.

The numeral 22 designates an endless slat conveyor, the upper run of which travels longitudinally of and above the bed plate 14, and the lower run of which travels generally beneath the frame of the machine and beneath the collecting chamber or hopper 18. This endless slat conveyor embodies a pair of sprocket chains 23, engaging a pair of forward sprocket wheels 24, and a pair of rear sprocket wheels 25. The sprocket chains 23 are connected by transverse slats 26, Figure 4, which extend downwardly between the sprocket wheels and are substantially flush with the lower surfaces of the same, the upper runs of the sprocket chains and the lower edges of the slats slidably engaging the bed plate 14, during their travel. The lower sprocket wheels 24 are mounted upon a transverse shaft 27, suitably journaled in openings formed in the sides 9. The sprocket wheels 24 and endless slat conveyor operate within a suitable opening 28, formed in the bed plate 15, and this opening is covered by an inclined guard 29, attached to the lower forward end of the bed plate 15, and a flexible strip 30, of canvas or the like is attached to the upper rear end of the guard 29 and serves as a check valve to prevent back travel of the material into the space beneath the guard 29. The flexible flap 30 is arranged above the endless slat conveyor and yields to the action of the transverse slats 26, allowing them to pass the same, the slats, at the same time, beating or shifting the flexible flap in a rearward direction and serving to shake the material therefrom, which might collect thereon. The sprocket wheels 25 are rigidly mounted upon a transverse shaft 31, suitably journaled in openings formed in the sides 9, and this shaft is driven by a bevel gear 32, rigidly mounted thereon.

The lower run of the endless slat conveyor 26 passes beneath and in engagement with a vertically curved guide 33, attached to the adjacent ends of the bottom walls 19 and 20, while this run also travels above the plate 10 and has its slats 26 slidably engaging the upper surface of the same.

Arranged within the trough or pocket 21 is an endless conveyor including a sprocket chain 34, carrying paddles 35. This sprocket chain is passed about sprocket wheels 36 and 37, carried by shafts 38 and 39, respectively. These shafts are journaled in suitable bearings. The conveyor discharges the threshed grain over an extension or chute 40' into the lower intake end of an inclined tube or chute 40, having a similar endless conveyor 41, therein. The chute 40 has a spout or neck 42, to which a bag 43 may be suitably attached, for filling. The endless conveyor 41 is driven by a shaft 44, connected with a sprocket wheel 45, through the medium of a shaft 44' and a universal joint 45'. The shaft 44 is journaled in a bearing 46'. The chute is pivotally mounted within a yoke 47', pivotally mounted in an eye 48', carried by a stationary arm. A universal support is, therefore, provided to support the chute, so that it remains relatively stationary as the frame of the machine passes over irregular ground. The shaft 44 is driven by a sprocket wheel 46, rigidly attached to one end thereof, and this sprocket wheel 46, is driven by a sprocket chain 47, engaging a sprocket wheel 48, rigidly mounted upon the shaft 38. A shaft 49 has a universal joint 50, with the shaft 38, and this shaft extends rearwardly and upwardly and has a bevel gear 51, engaging the bevel gear 32. The shaft 38 receives its rotation from a bevel gear 52, rigidly mounted thereon, which is driven by a bevel gear 53, in turn rigidly mounted upon a transverse shaft 54, suitably supported by the adjacent side 9. The shaft 54 is driven by a shaft 55, having a universal connection 56 therewith, and this shaft has a universal connection at 57 with a stub shaft 58, carried by a suitably supported bearing 59. This stub shaft 58 is driven by a sprocket wheel 60, and engaged by a sprocket chain 61, engaging a sprocket wheel 62 rotated by one of the traction wheels 6, of the mower. The shaft 54 carries a sprocket wheel 63, rigidly connected therewith, and this sprocket wheel engages a sprocket chain 64, extending forwardly for engaging a sprocket wheel 65, for a purpose to be described.

The numeral 66 designates a threshing reel of any well known and preferred type, embodying radial threshing elements or fingers 67. This threshing reel is mounted directly over the mower bar 8, and is rigidly secured to a horizontal transverse shaft 68, journaled in bearings formed in the upper ends of arms 69, which are rigidly attached to the sides 9 and braces 70, as shown. The shaft 68 has the sprocket wheel 65 rigidly mounted thereon. The arrangement is such that when the harvesting machine is moved forwardly, the threshing reel is turned in the direction of its arrow, thereby threshing the seed, and, at the same time, feeding or throwing the same longitudinally of the bed plate in a rearward direction, whereby such material is passed over and rearwardly beyond the guard 29.

The operation of the machine is as follows:

The mower and the threshing machine are drawn forwardly by the draft appliance 7, and the cutting mechanism of the mower, including the mower bar 8, cuts the straw, while the threshing reel 66, rotating in the direction of its arrow, serves to thresh the seed from the cut straw, throwing and sweeping the material rearwardly over and beyond the inclined guard 29, the backward feeding of the material being prevented by the flexible check 30. The straw and threshed seed now drop upon the imperforate lower forward portion of the bed plate 14, in advance of the flexible flap or check 30, and the slats 26 of the conveyor advance or sweep the same longitudinally of the bed plate, over and across the apertures 17. The sweeping or pushing of the straw and seed over the bed plate serves to roll or agitate the same to a considerable extent, whereby the seed will pass through the apertures 17 into the hopper 16, the straw and other foreign matter discharging from the upper rear ends of the endless slat conveyor. The threshed seed passing into the hopper or chamber 18 gravitates down the inclined plates 19 and 20, and is collected upon the bottom 21 of the hopper and is conducted in a transverse direction from the trough by the conveyor 34, and then passes into the chute 40, and is elevated therein by the conveyor 41, and finally discharges through the spout 42.

It is to be understood that the form of my invention, herewith shown and described, is to be taken as a preferred example of the same, and that various changes in the shape, size and arrangement of parts may be resorted to, without departing from the spirit of my invention, or the scope of the subjoined claims.

Having thus described my invention, what I claim is:

1. The combination with a wheeled mower including a mower bar, of a threshing machine including an inclined frame extending downwardly in a forward direction and terminating adjacent to the mower bar, an inclined bed plate extending downwardly toward its forward end and carried by the inclined frame, said bed plate having an upper perforated portion, means forming a collecting hopper beneath the perforated portion of the bed plate, an endless slat conveyor having its upper run travelling above the bed plate and its lower run beneath the collecting hopper, and a rotatable threshing reel carried by the frame and disposed near and above the mower bar to act upon the material and throw the same in a rearwardly direction longitudinally of the bed plate.

2. The combination with a wheeled mower including a mower bar, of a threshing machine including an inclined frame extending downwardly toward its forward end and terminating adjacent to the mower bar, an inclined bed plate carried by the frame and extending downwardly toward its forward end, said bed plate having a perforated portion, means forming a collecting hopper beneath the perforated portion of the bed plate, an endless slat conveyor having its upper run travelling above the bed plate and its lower run beneath the collecting hopper, an inclined guard arranged above and adjacent to the lower end of the endless slat conveyor, a flexible check element attached to the inclined guard and engaging the upper side of said upper run, a rotatable reel carried by the frame and disposed near and above the mower bar, and means to turn the reel so that its lower portion travels rearwardly toward said guard.

3. The combination with a wheeled mower including a mower bar, of a threshing machine including an inclined frame extending downwardly toward its forward end and terminating adjacent to the mower bar, an inclined bed plate carried by the frame and extending downwardly toward its forward end, said bed plate having an upper perforated portion and a lower imperforate portion provided with a transverse opening, means forming a collecting hopper arranged beneath the perforated portion of the bed plate, an endless slat conveyor extending through the transverse opening and having its upper run arranged above the bed plate, an inclined guard extending over the transverse opening and spaced therefrom, a flexible check element carried by the guard and engaging the upper side of the endless slat conveyor, a rotatable reel mounted upon the frame and positioned near and above the mower bar, means to rotate the reel so that its lower portion travels in the direction rearwardly of the inclined guard, and means to drive the endless slat conveyor so that its upper run travels rearwardly.

4. The combination with a wheeled mower including a mower bar, of a threshing machine including an inclined wheeled frame having its lower end arranged adjacent to the mower bar, an inclined bed plate carried by the frame and extending downwardly toward its forward end, said bed plate having a perforated portion, means forming a collecting hopper beneath said perforated portion, said hopper having downwardly converging inclined walls forming a trough at their lower ends, an endless slat conveyor having its upper run travelling above the bed plate and its lower run travelling beneath the collecting hopper, conveying means for removing material from the trough, a reel mounted upon the frame and arranged near and above the mower bar, means to drive the reel so that its lower portion travels in a rearwardly direction, and means to drive the endless slat conveyor so that its upper run travels rearwardly.

5. The combination with a wheeled mower including a mower bar, of a threshing machine including an inclined frame having its lower end arranged adjacent to the mower bar, an inclined bed plate having a perforated portion, means forming a collecting hopper beneath said perforated portion and including downwardly converging walls producing a trough at their lower edges, an endless conveyor operating within the trough, an endless slat conveyor having its upper run travelling near and above the bed plate, and a rotatable reel operating near and above the mower bar.

In testimony whereof I affix my signature.

PRESLEY WILEY MEACHAM.